United States Patent [19]

Abbatiello et al.

[11] 3,836,834
[45] Sept. 17, 1974

[54] MACHINE PROTECTION SYSTEM
[75] Inventors: Leonard A. Abbatiello; Robert E. Hewgley, Jr., both of Oak Ridge; Paul C. Turner, Knoxville, all of Tenn.
[73] Assignee: The United States of America as represented by the United States Atomic Energy Commission, Washington, D.C.
[22] Filed: Nov. 13, 1973
[21] Appl. No.: 415,460

[52] U.S. Cl.................. 318/563, 318/39, 318/488, 235/151.11
[51] Int. Cl. ............................................ G05b 9/02
[58] Field of Search ............ 318/488, 39, 563, 571; 235/151.11

[56] References Cited
UNITED STATES PATENTS
3,728,595   4/1973   Adams............................ 318/571 X
3,735,157   5/1973   Whetham........................ 318/571 X
3,755,726   8/1973   Knipe................................ 318/563
3,777,125   12/1973  Whetham...................... 318/571 X

*Primary Examiner*—B. Dobeck
*Attorney, Agent, or Firm*—John A. Horan; David S. Zachry; David E. Breeden

[57] ABSTRACT

A protection system has been provided for preventing damage to a numerically controlled machining device in the event of a wreck. The protection system consists of a strain-gage-instrumented tool holder or tool holder support; amplifying; filtering; and comparing circuitry; and quick acting machine shutdown circuitry. The instrumented tool holder senses the cutting and side forces by means of strain gages mounted on the tool holder. The system initiates a shutdown whenever (1) an instantaneous force exceeds a preselected maximum (absolute failure), or (2) an average force suddenly changes its level by a preselected factor (dynamic error). Although the system does not prevent a wreck, the effects of the wreck are restricted to limited part damage rather than damage to the machine.

5 Claims, 2 Drawing Figures

MACHINE PROTECTION SYSTEM

BACKGROUND OF THE INVENTION

This invention relates generally to numerically controlled machining and more specifically to a method and apparatus for sensing excessive forces during the machining process to effect a machine shutdown and prevent machine damage.

This invention was made during the course of, or under, a contract with the Untied States Atomic Energy Commission.

With the increase in the use of numerically controlled (N/C) machines for precision production machining, it is increasingly important to provide protection systems for these machines to prevent unnecessary wear, thus extending the portion of machine life in which closetolerance production is possible. With the large investment required in purchasing today's accurate N/C machine tools, it is important that they be utilized properly. An unfortunate corollary is that as utilization of a machine tool increases, so also do the wear and the likelihood of machine wrecks. The wrecks are the result of operator error or equipment malfunctions. An expensive machine part is often lost when a wreck occurs but more importantly the wreck usually results in extensive machine tool damage which can require considerable time for repair of the machine tool. The cost of such repair and lost production capabilities have provided stimulus for the development of the subject comprehensive protection system.

The essence of the subject development rests in the realization that a machine tool slide is usually involved in these wrecks, and that in the initial stages of a wreck, the tool slide suddenly experiences extreme forces as it begins to collide with some fixed member such as a headstock or with the part being machined. Accordingly, the protection system that has been developed is intended to be sensitive to absolute and dynamic changes in tool force as well as to "out of zone" limit switches that have more conveniently been employed in order to afford some degree of wreck protection. The system reacts to selectable abnormal conditions and causes an immediate shutdown of the prime mover for the machine tool.

SUMMARY OF THE INVENTION

In view of the above, it is an object of this invention to provide a wreck protection system for an automatic machining device which senses abnormal forces on a machine tool to effect an automatic shutdown of the machine to prevent machine damage.

Other objects and many of the attendant advantages of the present invention will be obvious from the following detailed description of the invention taken in conjunction with the drawings.

DETAILED DESCRIPTION

Figure 2:
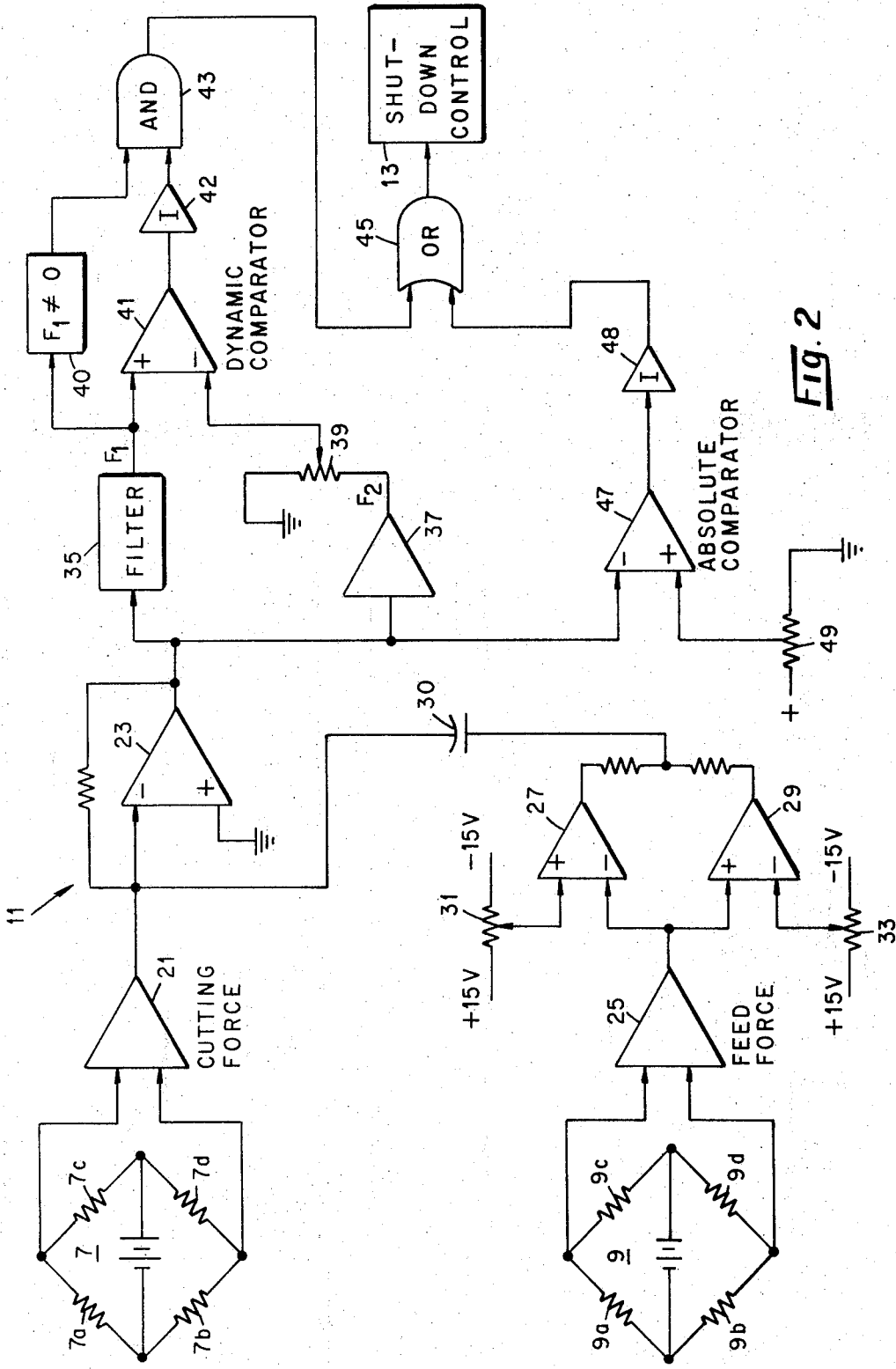
FIG. 2 is a logic diagram of the machine protection system according to the present invention wherein the strain gages of FIG. 1 are shown according to their electrical connection.

First, referring briefly to FIG. 2, it will be seen that the protection system's main components consist of an instrumented tool holder including strain gage bridges 7 and 9, a controller 11 for comparing the tool force with selected standards, and a logic shutdown control circuit 13 coupled to the output of the controller for effecting machine shutdown in a conventional manner when signaled by a logic level change at the output of the controller 11.

Figure 1:
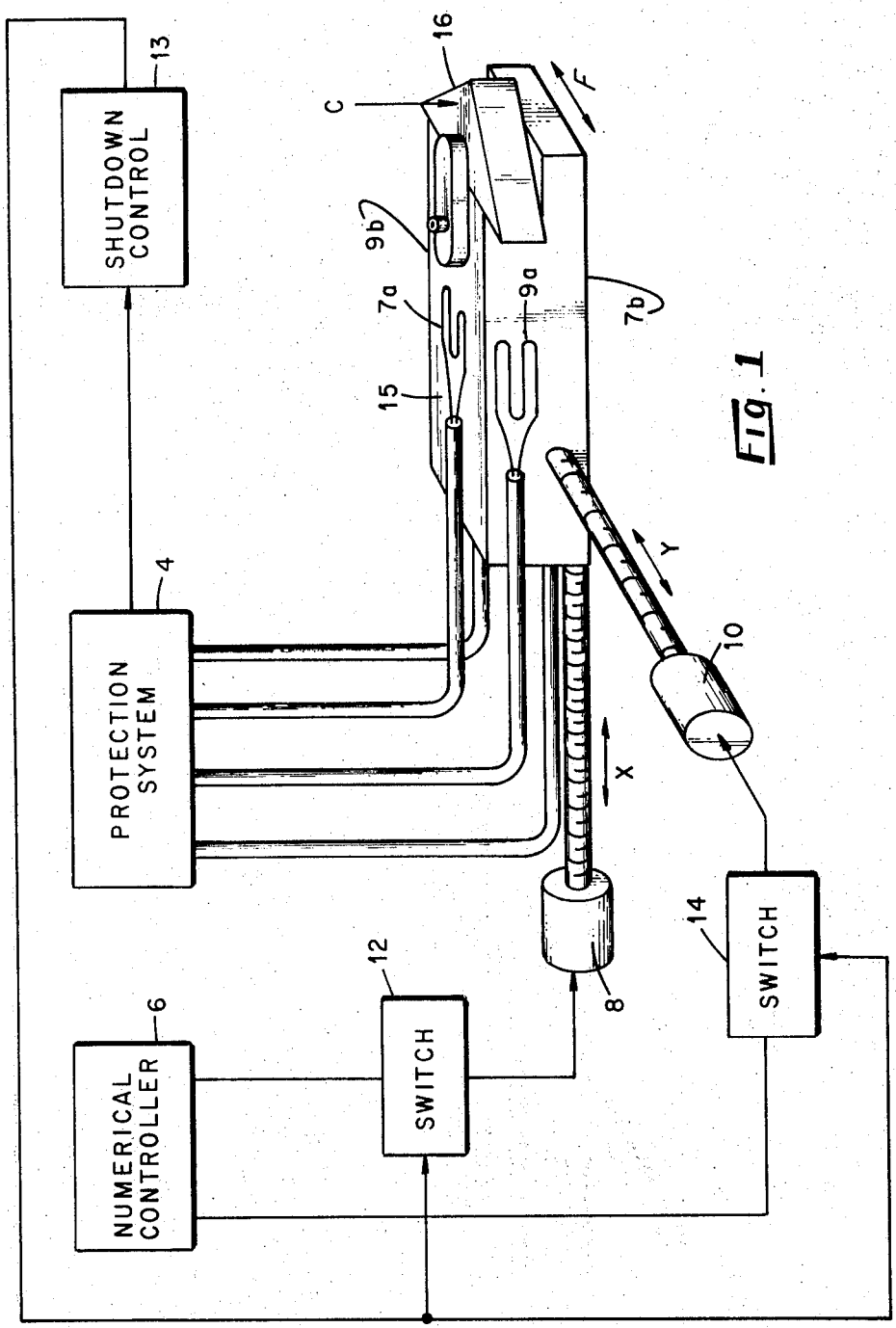
FIG. 1 is a schematic block diagram of a numerically controlled machining system showing a perspective view of the arrangement of strain gages on a typical machine tool holder for sensing forces exerted on the tool.

Referring now to FIG. 1, there is shown schematically a typical automatic machining device such as a NC controlled machine for positioning a machine tool holder 15. The tool holder 15 position, and thus the cutting tool position is controlled by a numerical controller 6 which provides programmed drive commands to the X and Y axis prime movers 8 and 10, respectively, through normally closed switches 12 and 14. The outputs of the strain gage bridges 7 and 9 are connected, as shown in FIG. 2, to the protection system 4 whose output is connected to the shutdown controller 13. The shutdown controller 13 functions in a manner to trip switches 12 and 14 to stop the tool holder 15 movement when out-of-tolerance force levels are detected by the protection system 4 as will be described hereinbelow.

The placement of the strain gages 7 and 9 is such that strain gages 7a and 7b detect the cutting force by being placed one on the top, 7a, and one on the bottom, 7b, of the tool holder 15. Since the cutting force C is for the most part a downward force, as a workpiece (not shown) is rotated counterclockwise against the tool 16, it tends to bend the holder 15 such that the top is in tension and the bottom is in compression at the points of location of the strain gages 7a and 7b, respectively. Similarly the reversible feed forces F tend to bend the tool holder 15 from side-to-side; and thus either side of holder 15 in the area of strain gages 9a and 9b may be in tension or compression depending upon the feed direction.

The strain gages mounted on the holder 15 are combined with similar impedance elements $c$ and $d$, for temperature compensation, in a conventional strain gage bridge arrangement as shown in FIG. 2.

The output of the strain gage bridge 7, which provides a signal proportional to the tangential (cutting) force of principal interest, is connected through an amplifier 21 to the summing input of a summing amplifier 23. The output of the strain gage bridge 9, which provides a signal proportional to the feed force, is connected through an amplifier 25 to one of the inputs of a negative signal level comparator 27 and positive signal level comparator 29 so as to detect out-of-range feed forces in either direction. The comparator amplifier 27 has a negative reference signal applied to the reference input from the selector arm of a potentiometer 31 which is connected between a +15 and −15 volt supply. The potentiometer 31 is set at a voltage proportional to the maximum allowable force on the tool in one direction represented by an increasing negative signal level at the output of amplifier 25 so that the output of amplifier 27 goes negative when the negative reference signal level is exceeded. In this case strain gage 9a will sense a compressive force while gage 9b will sense a tensile force.

Similarly, the comparator amplifier 29 has a positive reference signal applied to the reference input from the selector arm of a potentiometer 33 which is connected between the +15 and −15 volt supply. The potentiometer 33 is set at a voltage proportional to the maximum allowable force on the tool in the opposite direction represented by an increasing positive signal level at the output of amplifier 25 so that the output of amplifier 29 also goes negative when this limit is exceeded. In this case gage 9a senses a tensile force while gage 9b senses a compressive force.

The outputs of both comparator amplifiers 27 and 29 are connected to the summing input of the summing amplifier 23 through a capacitor 30. The triggering of either comparator 27 or 29 will cause the output of differential amplifier 23 to exceed a maximum signal level to force a machine shutdown as will be described hereinbelow.

Normally, the voltage signal at the output of amplifier 23 is understood to be a measure of the cutting force on the tool 16 (FIG. 1). There is normally no contribution from the feed force unless there is an excessive feed force in either direction. However, if one of the comparators 27 or 29 triggers, amplifier 17 will produce a much higher than normal output voltage due to increased sum input. Also, it will be noted that some measure of protection is provided for a direct plunge of the tool into the workpiece or other object because the forces on tool holder 15 would appear as an increased cutting force sensed by the bridge 7 and would also produce an abrupt high signal level at the output of amplifier 23 similar to the signal condition following the triggering of one of the comparators 27 or 29.

The signal level at the output of amplifier 23 is monitored by the controller 11 to determine a shutdown condition, as will now be described. The controller 11 has several functions in the protection system. It is capable of acting as an averager for the normal varying tool force by means of a variable low pass filter 35 connected to the output of amplifier 23. The filter 35 typically has a one second time constant and acts to average the voltage input signal over the last second. A comparison of the instantaneous voltage at the output of amplifier 23 to the averaged signal at the output of filter 35 is made to determine if the instantaneous signal amplitude from amplifier 23 is greater than a preselected multiple of the average tool force. Such a condition occurs in a runaway condition of the machine while in the cutting process. Tool forces rising very rapidly are a key indication that some malfunction in the cutting process has occurred.

In order to make this comparison, the output of amplifier 23 is connected to the input of an amplifier 37 which has a selected gain. The output of amplifier 37 is connected through a potentiometer 39 to ground potential. The selector arm of potentiometer 39 is connected to the inverting (−) input of a comparator amplifier 41 which has its other input connected to the output of filter 35. A selected multiple of the amplified instantaneous force signal from amplifier 37 determined by the setting of potentiometer 39 is compared with the averaged signal by means of comparator 41. The potentiometer 39 which defines the multiple of comparison for the two signals is normally present so that the instantaneous force signal $F_2$ must be greater than the averaged force $F_1$ times a selected constant C.

When the selected votage from potentiometer 39 (which is $F_2 \times 1/C$) exceeds the average voltage at the output of filter 35 the output of amplifier 41 will go negative indicating a shutdown is necessary.

The output of comparator 41 is connected through an inverter 42 to one input of an AND gate 43 which has an enabling input connected to a switching logic network 40 which prevents a shutdown during interrupted cuts or startup conditions wherein $F_1 = 0$. Under these conditions, the average tool force is zero and the tool load suddenly increases. The logic circuit 40 is connected to the output of filter 35 and produces a logic 1 output as long as the averaged cutting force $F_1$ is greater than zero. By disabling gate 43 until a non-zero average tool force has been established, machine shutdowns due to dynamic changes in tool force will not occur during these times. The output of gate 43 is connected to the logic shutdown circuitry 13 through one input of an OR gate 45.

In addition to the dynamic force comparator circuit of the controller 11 described above, the controller has provisions for an absolute force comparator which may also trigger a machine shutdown. This insures that forces greater than a preselected limit are not tolerated. To make this comparison the output of amplifier 23 is connected to the (−) input of a comparator amplifier 47 which has a reference input connected to the selector arm of a reference voltage potentiometer 49 connected between a positive voltage source and ground potential. The output of comparator 47 is connected through an inverter 48 to a second input of OR gate 45 to trigger a shutdown when the absolute force signal exceeds the reference signal applied to comparator 47. The reference voltage from potentiometer 49 may be set such that an excess force value of one-half the force that the machine is capable of safely withstanding. For example, during a machining operation, a slowly increasing error in slide position may result in a gradual increase to an unacceptable cutting force or perhaps a runaway condition occurs during startup or nonmachining operations. In either case the absolute force comparator 47 would cause a machine shutdown when the absolute force signal at the output of amplifier 23 exceeds the reference signal level of comparator 47.

The logic shutdown circuit may take various conventional forms to disable the prime movers for the machine tool until reset by an operator. For example, when hydraulic pulse motors are used as prime movers, fast acting blocking valves may be placed in the hydraulic lines to stop the machine very rapidly. If electric drive motors are used the logic shutdown circuit 13 may act in response to an input signal to remove the drive signal and short the motors to brake the movement. The shutdown circuit 13 may be further modified to include limit switches or other means for sensing that a moving member is out of its acceptable zone. Such sensors, suitably located, will not allow a moving member to proceed to the point of a collision, such as collision between slides and headstock or tailstock.

To summarize the operation of the controller it will be understood that the output of strain-gage bridge 7 provides a signal proportional to the tool cutting force and the bridge 9 provides signals proportional to the feed force in either direction. The feed force is constantly compared with a positive and negative reference level by means of comparators 27 and 29 as described above. The cutting force signal as amplified by means of amplifier 23 and constantly applied to filter 35 which averages the force signal over a one-second time interval and applies the averaged signal to the (+) (non-inverting) input of the dynamic comparator 41. An abrupt change in the output signal from either of the bridges 7 or 9, as in the case of a collision, will cause the output of amplifier 23 to sharply rise. This sharp rise is amplified by amplifier 37 and the appropriate multiple factor of this signal, selected by potentiometer 39, is applied to the comparator 41 to be compared with the averaged force signal. If the signal from potentiometer 39 exceeds the average signal, the comparator 41 will trigger and, assuming gate 43 has been enabled by the switching logic ($F_1 \neq 0$) a logic 1 will be applied through OR gate 45 to trigger the logic shutdown circuit 13 and stop the machine.

Since this circuit may not detect a slowly increasing force signal, the absolute comparator 47 will operate to trigger a shutdown if the force signal increases to a value which exceeds the reference level set by potentiometer 49.

While the invention has been described by way of illustration of a preferred embodiment, it will be apparent to those skilled in the art that various modifications and improvements may be made without departing from the spirit and scope of the invention as set forth in the claims. For example, various other force sensing means may be employed to sense the tool cutting and feed forces. The tool holder may be mounted on the tool post using strain gage washers to sense the forces in place of the strain gages on the tool holder.

What is claimed is:

1. In combination with a numerical controlled machining system wherein a cutting tool carried by a tool holder which is automatically positioned by means of the application of drive commands to at least one prime mover, a protection system, comprising:

a cutting force sensing means mounted with said tool holder for sensing forces induced in said holder from the cutting force applied to said cutting tool and providing an electrical signal at an output proportional to said cutting force;

a feed force sensing means mounted with said tool holder for sensing forces induced in said holder from the feed force applied to said cutting tool and providing an electrical signal at an output proportional to said feed force;

a feed force comparator means connected to receive the feed force signal for comparing said feed force with a feed force reference signal level and producing a signal at an output thereof when said feed force signal exceeds said feed force reference signal level;

a summing amplifier having a summing input and an output, said summing input connected to receive the cutting force signal from said cutting force sensing means and the output of said feed force comparator to provide an instantaneous output signal normally proportional to said cutting force;

a filter connected to the output of said summing amplifier for averaging the cutting force signal output of said summing amplifier over a time period selected by the time constant of said filter;

a dynamic force comparator means responsive to the averaged signal output of said filter and the instantaneous signal output of said summing amplifier for producing a shutdown signal at an output thereof when said instantaneous signal level exceeds a preselected multiple of said signal level;

an absolute force comparator means connected to the output of said summing amplifier for comparing the signal level at the output of said summing amplifier with a maximum absolute force reference signal level and providing a shutdown signal at an output thereof when the absolute force signal level exceeds said maximum absolute force reference signal level; and an output circuit means responsive to a shutdown signal from said dynamic force comparator means or said absolute force comparator means for interrupting the drive commands to said prime mover.

2. The combination as set forth in claim 1 wherein said dynamic force comparator means includes a comparator amplifier having one input connected to the output of said filter, an instantaneous force signal amplifier connected to the output of said summing amplifier for providing an amplifier signal at an output thereof proportional to the instantaneous force applied to said cutting tool, and a variable resistance means connected between the output of said instantaneous force signal amplifier and a second input of said comparator for selecting the level at which said dynamic force comparator triggers to produce a shutdown signal.

3. The combination as set forth in claim 2 wherein said output circuit means includes a shutdown control circuit means coupled to said prime mover for interrupting said drive commands when a shutdown signal is applied to an input thereof, an OR gate having a first and second input and an output, said first input being connected to the output of said absolute force comparator means; an AND gate having first and second inputs and an output, said output connected to said second input of said OR gate and said first input connected to the output of said dynamic force comparator means; and a logic circuit means connected between the output of said filter and said second input of said AND gate for disabling said AND gate to block the passage of shutdown signals when said averaged cutting force signal at the output of said filter is at a zero level.

4. The combination as set forth in claim 1 wherein said feed force sensing means and said feed force comparator means comprise a first strain gage bridge network including strain gages mounted on opposite surfaces of said tool holder to sense the magnitude and direction of forces induced in said tool holder from feed forces applied to said cutting tool so that said bridge network produces a feed force output signal having a magnitude and a polarity corresponding to the direction of said feed force, a first comparator coupled to said bridge network and having a negative reference voltage level for producing an output signal to said summing amplifier when said feed force signal exceeds said negative reference voltage level indicating an excessive feed force in one direction and a second comparator coupled to said bridge network and having a positive reference voltage level for producing an output signal to said summing amplifier when said feed force signal exceeds said positive reference voltage level indicating an excessive feed force in the direction opposite said one direction.

5. The combination as set forth in claim 4 wherein said cutting force sensing means comprises a second strain gage bridge network including further strain gages mounted on opposite surfaces of said tool holder at right angles to the surfaces on which said strain gages are mounted to sense said feed forces, said second bridge network having an output coupled to the input of said summing amplifier.

* * * * *